United States Patent [19] [11] Patent Number: 4,906,854
Rauh et al. [45] Date of Patent: Mar. 6, 1990

[54] PROCESSING METHOD AND APPARATUS FOR EXPOSED AND DEVELOPED FILM WITH POSITION SENSING

[75] Inventors: Hans-Jürgen Rauh, Strasslach-Hailafing; Helmut Treiber, Munich, both of Fed. Rep. of Germany

[73] Assignee: Afga-Gevaert Aktiengesellschaft, Leverkusen, Fed. Rep. of Germany

[21] Appl. No.: 264,314

[22] Filed: Oct. 28, 1988

[30] Foreign Application Priority Data

Nov. 6, 1987 [DE] Fed. Rep. of Germany ....... 3737797

[51] Int. Cl.$^4$ ............................................. G01N 21/86
[52] U.S. Cl. .................................... 250/561; 250/570
[58] Field of Search ............... 250/560, 561, 570, 548; 353/26 A; 354/298, 319, 215; 356/443, 444; 352/92; 355/41, 77

[56] References Cited

U.S. PATENT DOCUMENTS 4,207,473  6/1980  Nakatani et al. ............... 353/26 A
4,611,907  9/1986  Inatsuki ......................... 250/570
4,673,815  6/1987  Fruth et al. .................... 250/570

Primary Examiner—David C. Nelms

[57] ABSTRACT

An exposed and developed filmstrip has a longitudinally extending row of image areas and a row of perforations along each longitudinal margin. The image areas and perforations have no fixed positional relationship. The filmstrip is conveyed lengthwise from a scanning station to an operating station. A procedure involving the filmstrip is performed at the operating station when an image area is present at such station. To establish the arrival of an image area at the operating station, the filmstrip is photoelectrically scanned at the scanning station to locate the leading edge of the image area. The leading edge is conveyed from a preselected location, which may or may not be the scanning station, to the oeprating station along a path of fixed length. The length of the path is expressed in terms of the spacing between neighboring perforations of a row and the arrival of the leading edge at the operating station is established by counting perforations as the filmstrip travels. Fractions of the perforation spacing, which may arise if the leading edge is located between two perforations or if the path length is not an integral multiple of the perforation spacing, are measured by counting the steps performed by a stepping motor which drives the filmstrip or by counting the revolutions of rollers which engage the filmstrip.

23 Claims, 1 Drawing Sheet

PROCESSING METHOD AND APPARATUS FOR EXPOSED AND DEVELOPED FILM WITH POSITION SENSING

BACKGROUND OF THE INVENTION

The invention relates generally to the processing of photosensitive material.

More particularly, the invention relates to the processing of an elongated band of exposed and developed photosensitive material.

An exposed and developed photographic filmstrip generally has a series of images which are situated next to one another as considered longitudinally of the filmstrip. Such a filmstrip is usually provided with a longitudinal row of perforations adjacent to its edges and the perforations can be engaged by sprocket wheels in order to advance the filmstrip. Frequently, there is no specific positional relationship between the images and the perforations.

In photographic laboratory apparatus, it is occasionally necessary to photoelectrically determine the positions of the images in order to control various operations. By way of example, the positions of the images must be determined when the edges of 135 mm film are to be notched adjacent to the images. The notches may serve, for instance, to position the film in a printing station and then in a cutting station. It is also possible to position the images in the printing station directly on the basis of the photoelectric scan and to perform another such scan for the subsequent cutting operation. The photoelectric scan usually identifies an edge of an image, e.g., the leading edge, by the abrupt transition in transparency which occurs at an edge.

In all of the above cases, the location at which the filmstrip is scanned differs from that at which an operation is performed on the filmstrip. The reason is that, after a transparency transition indicative of an image edge has been found, it is of advantage to investigate another section of the filmstrip in order to ascertain that the transparency transition is not due to an object, e.g., a vertical and poorly illuminated telephone pole, which causes a transparency transition similar to an edge. A reasonably positive identification of an image edge is accordingly possible only after scanning an additional section of the filmstrip which includes at least one image. A more positive identification is achieved when the additional section includes several images. Thus, in order to identify an image edge with an adequate degree of certainty, the scanning station must be spaced from the following operating station by a distance which at least equals the length of an image, i.e., the distance between the leading and trailing edges of an image, and preferably equals several such lengths.

Spacing of the scanning station from the operating station requires very accurate monitoring of the distance travelled as the filmstrip advances from the scanning station to the operating station. Conventionally, measurement of the distance travelled is carried out using rollers which fractionally engage the filmstrip and are arranged to generate pulses as they rotate. For the measurement to be precise, no slip should occur between the filmstrip and the rollers and, in addition, the diameters of the rollers should not change due to wear. However, it is difficult to satisfy both of these requirements simultaneously. Rollers having a high coefficient of friction are generally subject to wear and can also deform elastically. On the other hand, rollers which do not wear easily have a smooth surface so that slip takes place more readily. Accordingly, accurate monitoring of film travel, which is especially critical for larger distances, cannot be achieved with this measurement system.

OBJECTS AND SUMMARY OF THE INVENTION

It is an object of the invention to provide a method which allows the travel of photosensitive material to be monitored more accurately.

Another object of the invention is to provide a method which enables the negative impact of slip on measurement accuracy to be reduced.

An additional object of the invention is to provide a method which makes it possible to reduce the negative impact of wear on measurement accuracy.

A further object of the invention is to provide an apparatus which is capable of monitoring the travel of photosensitive material with increased accuracy.

It is also an object of the invention to provide an apparatus which enables a reduction in the negative impact of slip on measurement accuracy to be realized.

A concomitant object of the invention is to provide an apparatus which permits the negative impact of wear on measurement accuracy to be reduced.

The preceding objects, as well as others which will become apparent as the description proceeds, are achieved by the invention.

One aspect of the invention resides in a method of processing an elongated band of photosensitive material, e.g., photographic film, having a plurality of exposed and developed areas, as well as a row of perforations, in the longitudinal direction of the band. The exposed and developed areas will also be referred to as image areas. The perforations, which may be provided on the band for the purpose of advancing the latter by means of sprocket wheels designed to engage the perforations, may be disposed along on of the longitudinal marginal portions or edges of the band. The image areas and the perforations are arranged in such a manner that the position of a first image area relative to the perforations differs from that of a second area relative to the perforations, i.e., there is no common positional relationship between the image areas and the perforations. In the method, the band is conveyed lengthwise in a predetermined direction between a first or measuring location and a downstream second or operating location. One of the image areas is sensed at the measuring location, e.g., photoelectrically, and a procedure involving the band is performed at the operating location when the sensed area is present at this location. The method further comprises establishing the arrival of the sensed area at the operating location by measuring the distance travelled by the band. The establishing step includes counting at least some of the perforations subsequent to the sensing step as the band travels in the predetermined direction.

The establishing step may additionally include detecting movement of the band in a manner other than by counting of the perforations. By way of example, this may be accomplished by frictionally engaging the band with one or more rotary elements which rotate during advancement of the band. The rotary elements may cause a pulse to be generated for each revolution or fractional revolution thereof.

The method may further involve regulating travel of the band on the basis of the establishing step. For instance, travel of the band may be temporarily interrupted when arrival of the sensed area at the operating location has been established.

The sensed image area may be conveyed from the measuring location to the operating location along a path of fixed length. The establishing step then comprises measuring a distance substantially equal to such length.

The perforations may have a predetermined spacing and it is possible for an image area to have a leading edge which is disposed downstream of a selected perforation by a fraction of this spacing, i.e., the leading edge of the image area is located between the selected perforation and its neighboring downstream perforation. The sensing step may here involve sensing the leading edge of the image area while the establishing step involves measuring the fraction of the spacing. It may occur that the path followed by the sensed area from the measuring location to the operating location has a length equal to the fractional spacing plus the distance between the selected perforation and an upstream perforation plus another fraction of the perforating spacing. In such an event, the establishing step is carried out by counting perforations from the selected perforation to the upstream perforation and measuring both fractional spacings.

If counting is performed at a single location and the band has a splice, the counting operation could be affected when the splice passes by such location. Interference with the counting operation may be void by counting perforations at two spaced locations simultaneously. These locations should be separated by at least the width of the splice as considered longitudinally of the band. It is further preferred for the counting locations to be separated by an integral multiple of the perforation spacing.

Under certain circumstances, the path travelled by the band between the measuring location and the operating location may have a variable or undefined length. Here, the position of an image area is established by counting the number of perforations between the area and a selected region of the band such as a splice. If the leading edge of the image area is situated between two perforations, the fractional spacing from the last of the counted perforations to the leading edge is also measured. Counting of the perforations and measurement of the fractional spacing are initially performed at a first counting location upstream of the operating location. This counting and measurement are then repeated at a second counting location between the first counting location and the operating location. The second counting location is disposed at a predetermined distance from the operating location and the path of the band from the second counting location to the operating location has a length equal to this distance. Such distance may be a predetermined integral multiple of the perforation spacing or a predetermined integral multiple plus a predetermined fraction of the spacing. To establish arrival of the image area at the operating location, additional perforations corresponding to the predetermined integral multiple are counted at the second counting location and, if necessary, the predetermined fraction of the perforation spacing is also measured at this location. In other words, the distance between an image area and the first perforation following a splice is determined at the first counting location. At the second counting location, the sum of this distance and the distance to the operating location is measured to thereby establish the arrival of the image area at the operating location.

Another aspect of the invention resides in an apparatus for processing a elongated band of photosensitive material having a plurality of exposed and developed areas, and a row of perforations, in the longitudinal direction of the band. Again the perforations may serve for advancement of the band and may be situated along one of the longitudinal marginal portions or edges of the same. Moreover, as before, there need be no fixed positional relationship between the image areas and the perforations, that is, the position of a first image area relative to the perforations may be different from that of a second image area relative to the perforations. The apparatus comprises means at a first or measuring location for sensing the image areas, preferably an edge of the areas, and means at a second or operating location for performing a procedure involving the band when one of the image areas is at the operating location. The apparatus further comprises means for conveying the band lengthwise in a direction from the measuring location to the operating location and for establishing the arrival of an area at the operating location. The conveying and establishing means includes first and second means for differently measuring the distance travelled by the band and the first means is designed to count the perforations on the band during travel of the latter. In a preferred embodiment of the apparatus, the second means is designed to measure the distance travelled by the band through frictional engagement with the latter, e.g., the second means may comprise at least one rotary element which contracts the band and rotates as the band travels and causes the generation of a pulse during each revolution or fractional revolution.

The apparatus may additionally include control means for regulating travel of the band in response to signals from the first and second means. For instance, the control means may operate to temporarily interrupt movement of the band when the first and second means indicate that an image area has arrived at the operating location.

In accordance with the invention, measurement of the distance travelled by the band is based largely on a determination of the number of integral multiples of the perforation spacing traversed by the band. Therefore, distance measurement using friction rollers which rotate in response to movement of the band may be limited to very short spans. If the leading edge of an image area is located between two perforations, the span is that from the leading edge to the first perforation upstream of this edge. Furthermore, should the path from the measuring station to the operating station have a length which, for example, equals an integral multiple of the perforation spacing, a similar second span, corresponding to the difference between the perforation spacing and the first span, would exist upstream of the last perforation to be counted. In any event, regardless of the length of the path between the measuring and operating stations, the sum of the spans is at most equal to two perforation spacings. Accordingly, measurement errors due to slip effects and wear can arise only in a very small part of the path.

The novel features which are considered as characteristic of the invention are set forth in particular in the appended claims. The improved processing method, as well as the construction and mode of operation of the improved processing apparatus, together with additional features and advantages thereof, will, however, be best understood upon perusal of the following detailed description of certain specific embodiments when read in conjunction with the accompanying drawings.

DESCRIPTION OF THE PREFERRED EMBODIMENTS

Figure 1:
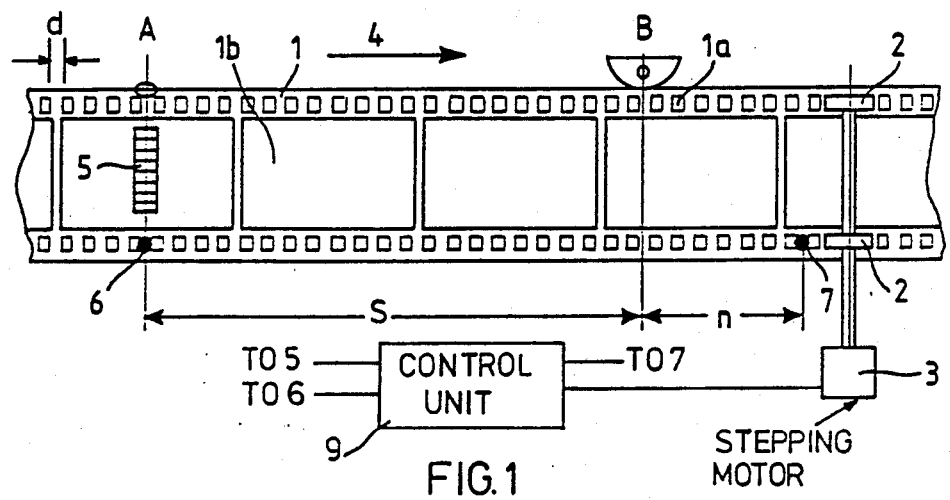
FIG. 1 schematically illustrates one embodiment of an apparatus in accordance with the invention for processing elongated bands of photosensitive material.

FIG. 1 is a schematic representation of an apparatus in accordance with the invention for processing an elongated band 1 of photosensitive material. The band 1 is here assumed to be a 135 mm photographic filmstrip or film, that is, a so-called small format film. The filmstrip 1 has a row of perforations 1a extending along each of the longitudinal marginal portions or edges thereof. The perforations 1a, which are spaced from one another by a substantially uniform spacing d, function to permit advancement of the filmstrip 1 by means of sprocket wheels or the like arranged to engage the perforations 1a. The perforations 1a were punched out of the filmstrip 1 during production of the latter and the punching operation was carried out with great accuracy because it is also employed for motion picture film where the precision of the perforations affects image quality during both filming and projection.

It is assumed that the filmstrip 1 was exposed in a conventional small format camera and then developed so that the filmstrip 1 carries a row of image areas 1b extending in the longitudinal direction of the filmstrip 1. The image areas 1b have no set positional relationship with respect to the perforations 1a, that is, the position of any image area 1b relative to the perforations 1a flanking such image area 1b is different from the position of at least one other image area 1b relative to the perforations 1a flanking the same. Accordingly, special means are required to position the image areas 1b in, or to establish the arrival of the image areas 1b at, an automatic processing or operating station B. The operating station B is designed to perform a procedure using the filmstrip 1 whenever an image area 1b is located at the station B. By way of example, the operating station B may include a device 10 for punching a notch in at least one of the longitudinal marginal portions of the filmstrip 1 next to each image area 1b. These notches are then used to locate the image areas 1b in a non-illustrated printing station and a following, non-illustrated cutting station. If the apparatus of the invention is a printing or copying apparatus, the operating station B may alternatively be a printing station having a printing window with which the image area 1b are to be juxtaposed for printing.

The filmstrip 1 is conveyed through the processing apparatus lengthwise in the direction indicated by an arrow 4. Two pairs of rollers 2 are disposed downstream of the operating station B. Each pair of rollers 2 includes a friction roller shown in FIG. 1 and located on one side of the filmstrip 1. Each pair of rollers 2 further includes a roller which is not visible in FIG. 1 and has a wear-resistant surface. The wear-resistant rollers are situated on the opposite side of the filmstrip 1 from the friction rollers and each of the wear-resistant rollers is arranged to cooperate with the respective friction roller. The friction rollers are driven by an electrical motor 3 while the wear-resistant rollers are freely rotatable.

A measuring or scanning station A is disposed upstream of the operating station B and is spaced from the latter by a distance s. The filmstrip 1 is conveyed from the scanning station A to the operating station B along a path having a fixed length equal to the distance s. The scanning station A is provided with a photoelectric scanning device 5 which may include, for example, a row of measuring cells or a linear charge-coupled device extending transversely of the filmstrip 1. The scanning device 5 continuously measures the transparency of the filmstrip 1 at a series of points across the width of the same. The transparency values delivered by the scanning device 5 are transmitted to a central processing or control unit 9 which examines these values, e.g., in accordance with the teachings of the U.S. Pat. No. 4,167,678, for abrupt transparency transitions which could indicate the presence of an edge of an image area 1b. The scanning device 5, which is arranged to detect the leading and trailing edges of the image areas 1b, thus serves to sense the image areas 1b. To increase the probability that an abrupt transparency transition represents an edge of an image area 1b and not an object within an area 1b, a relatively long span of the filmstrip 1 is scanned before an image area 1b at the scanning station A enters the operating station b. The distance s between the scanning station A and the operating station B is accordingly relatively large. In the illustrated embodiment, the distance s essentially equals the length of a section of the filmstrip 1 containing three image areas 1b.

The motor 3 for the friction rollers of the roller pairs 2 is a stepping motor which is supplied with electrical pulses from a suitable source and causes the friction rollers to rotate through a predetermined angle in response to each pulse. The pulses delivered to the motor 3 are therefore a direct measure of the distance travelled by the filmstrip 1. These pulses are registered in the control unit 9. Alternatively, the distance travelled by the filmstrip 1 can be measured by connecting the wear-resistant rollers of the roller pairs 2 to conventional devices for determining distance travelled, e.g., devices operating with perforated discs and photocells. Such devices may be designed to generate a pulse whenever the filmstrip 1 advances by a predetermined increment such as, for example, 0.2 mm. The pulses are again sent to the control unit 9.

If the distance travelled by the filmstrip 1 is measured using the stepping motor 3, it is apparent that the measurement accuracy depends greatly upon the reliability of the motor 3 and the transmission of its movements to the filmstrip 1. On the other hand, if distance measurement is carried out employing measuring devices which are coupled to the wear-resistant rollers, the measurement accuracy will be greatly dependent upon the amount of slip between such rollers and the filmstrip 1.

In order to improve measurement accuracy, the invention provides a device 6 such as a light barrier which is arranged to detect the perforations 1a along one of the longitudinal marginal portions of the filmstrip 1. The light barrier 6, which is preferably located alongside the scanning device 5 as shown, emits a pulse whenever a perforation 1a passes by. The pulses are transmitted to the control unit 9 which counts the pulses, and hence the perforations 1a or perforation spacings d.

Assume that the distance s from the scanning station A to the operating station B is an integral multiple of the perforation spacing d and that the leading edge of an image area 1b approaching the scanning station A is located between two perforations 1a. The distance s, which is the distance that this image area 1b must travel in order to advance from the scanning station A to the operating station B, can then be expressed as the sum of a first fraction of the perforation spacing d, a predetermined multiple of the perforation spacing d and a second fraction of the perforation spacing d. The first fraction is the distance from the leading edge to the perforation 1a immediately upstream of the leading edge while the second fraction is the difference between the perforation spacing d and the first fraction, i.e., the sum of the first and second fractions equals the perforation spacing d. The predetermined multiple of the perforation spacing d is then the number of spacings d constituting the distance s minus 1.

The first fraction is measured by the stepping motor 3 and is represented by the number of steps which must be performed by the motor 3 in order to advance the first perforation 1a upstream of the leading edge to the light barrier 6 once the leading edge has been sensed by the scanning device 5. The predetermined multiple of the perforation spacing d is measured by the light barrier 6 which, after arrival of the first perforation upstream of the leading edge, generates a pulse whenever the filmstrip 1 had advanced by a distance equal to the perforation spacing d. The pulses are counted by the control unit 9. When the light barrier 6 detects the last perforation 1a, that is, the perforation 1a which is separated from the first perforation 1a upstream of the leading edge by the predetermined multiple, the leading edge is situated upstream of the operating station B by a distance equal to the second fraction. The second fraction is again measured by the stepping motor 3 as the distance between the light barrier 6 and the last perforation 1a at the time the leading edge reaches the desired position in the operating station B. Such distance is represented by the number of steps performed by the motor 3 between arrival of the last perforation 1a at the light barrier 6 and arrival of the leading edge at the operating station B. Any measurement errors stemming from unreliability of the stepping motor 3 and the transmission of its movements to the filmstrip 1 are confined to the small distances corresponding to the first and second fractions of the perforation spacing d. Similarly, if measurement of the distance travelled by the filmstrip 1 were carried out using measuring devices coupled to the wear-resistant rollers of the roller pairs 2, any measurement errors due to relative slipping of the wear-resistant rollers and filmstrip 1 would be limited to the first and second fractions. No matter where the leading edge of an image area 1b is located relative to the perforations 1a or what the distance s between the scanning station A and the operating station B, the sum of the first and second fractions need never be larger than twice the perforation spacing d.

The filmstrip 1 may have one or more splices which extend across the entire width thereof and cause breaks in the rows of perforations 1a. It can happen that such a splice, which interferes with detection of the perforations 1a by the light barrier 6, reaches the latter before a downstream image area 1b being tracked by the light barrier 6 has arrived at the operating station B. To avoid an interruption in the counting of the perforations 1a when this occurs, a second device 7 such as a light barrier is provided to detect the perforations 1a. The light barrier 7 is arranged at a known distance n from the operating station B and is located downstream of the light barrier 6 at a distance at least equal to the width of the splice as considered longitudinally of the filmstrip 1. The spacing between the light barriers 6 and 7 is further equal to an integral multiple of the perforation spacing d. The light barrier 7 detects the passing perforations 1a simultaneously with the light barrier 6 and, like the light barrier 6, sends a pulse to the control unit 9 in response to detection of a perforation 1a. Accordingly, when the light barrier 6 no longer detects the perforations 1a, and hence delivers no pulses, because of the arrival of the splice, the light barrier 7 can continue to measure, in terms of the number of perforations 1a or perforation spacings d, the distance still to be travelled by the image area 1b being tracked.

In order that the light barrier 6 may, after passage of the splice, resume counting of the perforations 1a or perforation spacings d for the image area 1b being tracked, it is necessary that the two films joined by the splice be accurately connected as regards the perforations 1a. Since this cannot be assured for all splicing apparatus, it is of advantage for the second light barrier 7 to be disposed downstream of the operating station B. This allows the light barrier 7 to track the last image area 1b downstream of the splice until its arrival at the operating station B.

Figure 2:
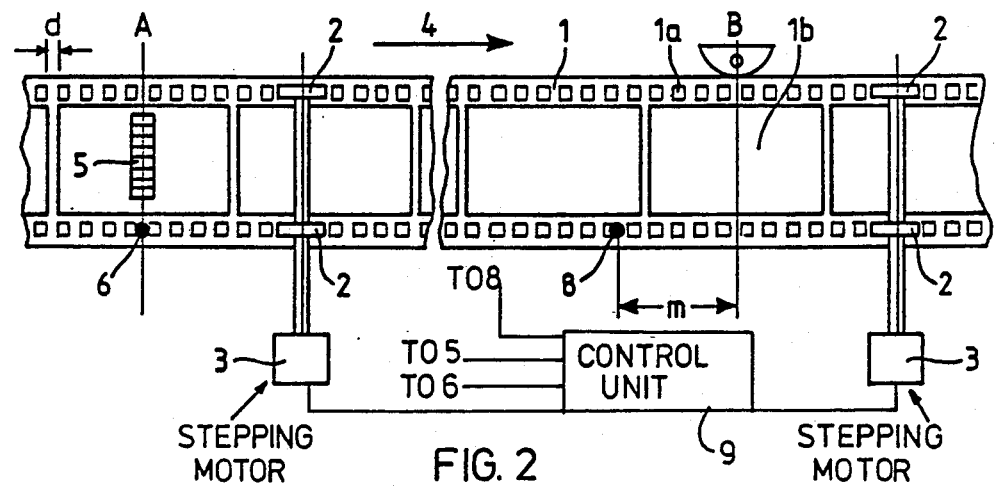
FIG. 2 schematically illustrates another embodiment of the apparatus.

In order to compensate for variations in the speed of the filmstrip 1, it may be necessary to form a loop in the filmstrip 1 between the scanning station A and the operating station B. Inasmuch as the length of such a loop is variable and cannot be predicted beforehand, the path of the filmstrip 1 from the scanning station A to the operating station B has an unknown and variable length. FIG. 2 shows a film processing apparatus according to the invention where the path is of variable length.

In FIG. 2, where the same reference characters as in FIG. 1 are used to identify similar elements, a first conveying means including two pairs of conveying rollers 2 and an associated stepping drive motor 3 is located in the general vicinity of the canning station A between the latter and the operating station B. A second conveying means likewise including two pairs of conveying rollers 2 and an associated stepping drive motor 3 is situated in the general vicinity, and downstream of the operating station B. Thus, in contrast to FIG. 1, the scanning station A and operating station B each have their own conveying means.

The scanning device 5 of FIG. 2 once more senses the leading edge of an image area 1b while the number of perforations 1a or perforation spacings d, as well as the positions of the perforations 1a relative to the leading edge, are again established by the light barrier 6. Here, however, the light barrier 6 is employed to count the number of perforations 1a between the leading edge and a selected region of the filmstrip 1 downstream of the leading edge. Preferably, the selected region is a splice and a count is taken of the number of perforations 1a between the leading edge of the image area 1b and the trailing end of the splice. Furthermore, if the leading edge is located between two perforations 1a, the fractional spacing between the leading edge and the perforation 1a immediately downstream of the leading edge is measured as the number of steps which must be performed by the stepping motor 3 of the scanning station A in order to advance the filmstrip 1 by the fractional spacing.

A second device 8, such as a light barrier, for detecting the perforations 1a is disposed at a distance m upstream of the operating station B. The distance m may equal an integral multiple, or an integral multiple plus a fraction, of the perforation spacing d. After the selected region or splice of the filmstrip 1 has passed by the light barrier 8, the control unit 9 begins to count the perforations 1a detected by the light barrier 8. Counting continues until the number of perforations 1a detected by the light barrier 8 equals the number of perforations 1a as detected by the light barrier 6, between the splice and the image area 1b being tracked plus the number of perforations 1a corresponding to the distance m between the light barrier 8 and the operating station B. Once this total has been reached, the stepping motor 3 of the operating station B performs a number of steps such that the filmstrip 1 advances by an additional distance equal to the fractional spacing previously measured by the stepping motor 3 of the scanning station A. The control unit 9 thereupon temporarily shuts off the motor 3 of the operating station B to permit the filmstrip 1 to be subjected to an operation.

Since the number of perforations 1a or perforation spacings d is determined independently at two different locations, relatively large sections of the filmstrip 1, up to the length of an entire individual film, may be monitored with virtually no error. The span of uncertainty in which errors can arise due to unreliability of a stepping motor 3 and unreliable transmission of its movements to the filmstrip 1, or due to relative slip of the rollers 2 and filmstrip 1, remains limited to a fraction of the perforation spacing d at the end of the path from the scanning station A to the operating station B. Even if the web between two of the perforations 1a is torn out, the resulting defect is evaluated in the same manner by the light barriers 6 and 8 so that it causes no error in the measurement of the distance travelled by the filmstrip 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of processing an elongated band of photosensitive material having a plurality of exposed and developed areas, and a row of perforations, in the longitudinal direction of said band, said areas and said perforations being arranged in such a manner that the position of a first area relative to said perforations differs from that of a second area relative to said perforations, and said method comprising the steps of conveying said band lengthwise in a predetermined direction between a first location and a downstream second location; sensing one of said areas at said first location; performing a procedure at said second location using said band, said procedure being carried out when said one area is at said second location; and establishing the arrival of said one area at said second location by measuring the distance travelled by said band, the establishing step including counting at least some of said perforations subsequent to the sensing step as said band travels in said predetermined direction.

2. The method of claim 1, wherein said one area is conveyed from said first location to said second location along a path of fixed length and the establishing step comprises measuring a distance substantially equal to said length.

3. The method of claim 1, further comprising the step of regulating travel of said band based on the establishing step.

4. The method of claim 1, wherein the sensing step is performed photoelectrically.

5. The method of claim 1, wherein the establishing step further includes detecting movement of said band in a second manner in addition to counting of said perforations.

6. The method of claim 1, said perforations having a predetermined spacing, and said one area having a leading edge disposed downstream of one of said perforations by a fraction of said spacing; and wherein the sensing step comprises sensing said leading edge and the establishing step comprises measuring said fraction.

7. The method of claim 6, said one area being conveyed from said first location to said second location along a path of length equal to said fraction plus the distance from said one perforation to an upstream perforation plus another fraction of said spacing; and wherein the establishing step comprises counting from said one perforation to said upstream perforation and measuring said another fraction.

8. The method of claim 1, wherein said counting is performed at a pair of spaced, preselected locations along said predetermined direction.

9. The method of claim 8, wherein said perforations have a predetermined spacing and said preselected locations are separated by an integral multiple of said spacing.

10. The method of claim 8, wherein said band has a splice of predetermined width as considered longitudinally of said band and said preselected locations are separated by at least said width.

11. The method of claim 1, said one area being separated from a selected region of said band by first perforations; and wherein the establishing step comprises counting said first perforations at a first preselected location upstream of said second location, counting said first perforations once more at a second preselected location between said first preselected location and said second location and spaced from the latter by a distance at least approximating the distance spanned by a predetermined number of said perforations, and counting a number of second perforations equal to said predetermined number at said second preselected location.

12. The method of claim 11, said perforations having a predetermined spacing, and said one area being separated from the nearest of said first perforations by a fraction of said spacing; and wherein the establishing step further comprises measuring said fraction at each of said first and second preselected locations.

13. The method of claim 11, said perforations having a predetermined spacing, and said second preselected location being spaced from said second location by an integral multiple plus a fraction of said spacing; and wherein the establishing step comprises measuring said fraction at said second preselected location.

14. The method of claim 11, wherein said selected region is a splice.

15. The method of claim 11, wherein said one area is conveyed from said first location to said second location along a path of variable length.

16. An apparatus for processing an elongated band of photosensitive material having a plurality of exposed and developed areas, and a row of perforations, in the longitudinal direction of the band, said apparatus comprising means at a firs location for sensing the areas; means at a second location for performing a procedure using the band when one of the areas is at said second location; and means for conveying the band lengthwise in a direction from said first location to said second location and for establishing the arrival of an area at said second location, said conveying and establishing means including first and second means for differently measuring the distance travelled by the band, and said first means being designed to detect the perforations on the band during travel of the latter.

17. The apparatus of claim 16, further comprising control means for regulating travel of the band in response to signals from said first and second means.

18. The apparatus of claim 16, wherein said second means is designed to measure the distance travelled by the band through frictional engagement with the latter.

19. The apparatus of claim 16, wherein said first means comprises a pair of detecting devices which are spaced along said direction.

20. The apparatus of claim 19, wherein the perforations have a predetermined spacing and said devices are separated by an integral multiple of such spacing.

21. The apparatus of claim 19, wherein the band has a splice of predetermined width as considered lengthwise of the band and said devices are separated by at least such width.

22. The apparatus of claim 16, wherein said first means comprises a first detecting device at a first preselected location upstream of said second location, and a second detecting device at a second preselected location between said first preselected location and said second location and spaced from the latter by a predetermined distance, said first device and second means being arranged to determine the spacing between a preselected perforation and a preselected area, and said second device and second means being arranged to measure a length of the band equal to the sum of said spacing and said predetermined distance; and further comprising control means for processing signals from said first and second means, said control means being designed to interrupt travel of the band in response to achievement of said sum.

23. The apparatus of claim 22, wherein said conveying and establishing means is designed to advance the band from said first location to said second location along a path of variable length.

* * * * *